United States Patent [19]

Chaumont

[11] 3,887,243
[45] June 3, 1975

[54] ENDLESS TRACK
[75] Inventor: Guy Noel Chaumont, Tring-Jonction, Quebec, Canada
[73] Assignee: Dayco Corporation, Dayton, Ohio
[22] Filed: Apr. 22, 1974
[21] Appl. No.: 463,072

[52] U.S. Cl. ............... 305/24; 305/35 EB; 180/5 R; 74/231 C
[51] Int. Cl. ............................................ B62d 55/24
[58] Field of Search .......... 305/24, 25, 35 R, 35 EB; 180/5 R; 74/231 C; 198/16 R, 202, 137, 229, 230

[56] References Cited
UNITED STATES PATENTS

| | | | |
|---|---|---|---|
| 3,580,647 | 5/1971 | Richards | 305/35 EB |
| 3,598,454 | 8/1971 | Richards | 305/35 EB |
| 3,680,925 | 8/1972 | Spivy | 305/24 |
| 3,711,164 | 1/1973 | Chaumont | 180/5 R |
| 3,722,961 | 3/1973 | Haley et al. | 180/5 R |
| 3,738,714 | 6/1973 | Ness | 305/24 |
| 3,774,979 | 11/1973 | Harris | 305/24 |

*Primary Examiner*—Philip Goodman
*Assistant Examiner*—John A. Carroll
*Attorney, Agent, or Firm*—Reuben Wolk

[57] ABSTRACT

An endless track particularly adapted to be used on motor driven vehicles such as tractors, snowmobiles, and the like, is provided and adapted to be moved in an endless path; and, the track comprises a main body made primarily of an elastomeric material and has a ground engaging surface and an inside surface with a plurality of reinforcing members being embedded within the main body and extending substantially perpendicular to the endless path. The track may have a plurality of openings in its main body arranged in at least one rectilinear row with each opening being closely adjacent an associated reinforcing member and a plurality of extruded metal clips are provided and supported in telescoped relation around an associated reinforcing member with each clip being adapted to be engaged by a toothed sprocket wheel which is adapted to drive the track in its endless path; and, each clip may be provided with a cleat which is adapted to slidably engage an associated slide rail system in a substantially frictionless manner.

20 Claims, 8 Drawing Figures 3,887,243

ENDLESS TRACK

BACKGROUND OF THE INVENTION

There are numerous tractors, snowmobiles, and similar vehicles in current use which are driven by endless traction belts or tracks made primarily of elastomeric materials and such tracks are often supported for movement in their endless paths by slide rail systems and driven by drive systems which employ sprockets having teeth which are received within sprocket receiving openings provided in the endless tracks. In general, currently used tracks of this type are deficient in that they tend to wear excessively at locations adjacent the sprocket receiving openings, tend to drag excessively on their associated slide rail systems requiring compatatively larger capacity drive systems, and tend to misalign during movement thereof about their associated slide rail systems.

SUMMARY

This invention provides an endless track particularly adapted to be used on a vehicle which employs a slide rail system to support the track during movement thereof in an endless path, which is driven by a drive system employing toothed sprocket wheels, and which overcomes the above-mentioned deficiencies of present systems.

The track comprises a main body made primarily of an elastomeric material and has a ground engaging surface and an inside surface with a plurality of reinforcing members being embedded within the main body and extending substantially perpendicular to the endless path. The track may have a plurality of openings in its main body arranged in at least one rectilinear row with each opening being closely adjacent an associated reinforcing member and a plurality of extruded metal clips are provided, each supported in telescoped relation around an associated reinforcing member with each clip being adapted to be engaged by a toothed sprocket wheel which is adapted to drive the track in its endless path; and, each clip may be provided with a cleat which is adapted to slidably engage an associated slide rail system in a substantially frictionless manner.

BRIEF DESCRIPTION OF THE DRAWING

The accompanying drawing shows present preferred embodiments of this invention, in which.

DESCRIPTION OF ILLUSTRATED EMBODIMENTS

Figure 1:
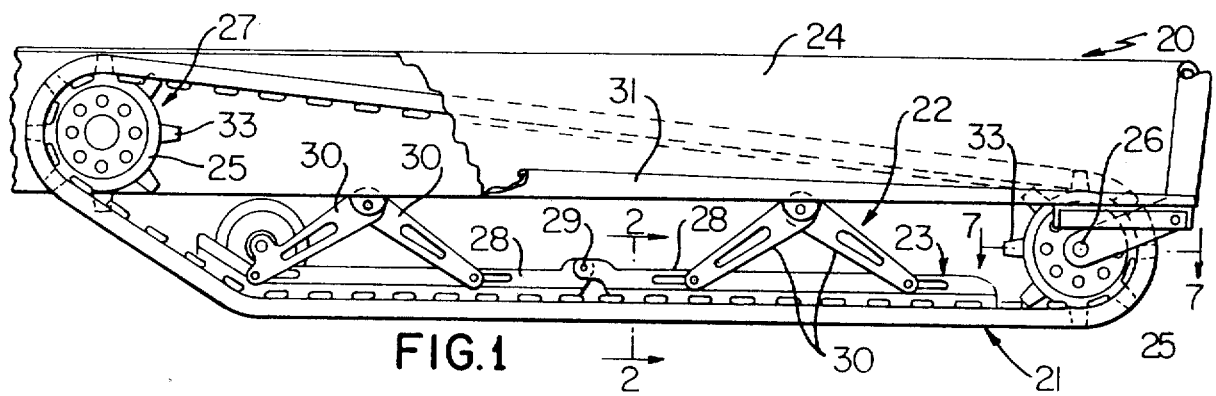
FIG. 1 is a side elevation of a portion of an exemplary vehicle in the form of a snowmobile which utilizes a slide rail system and one exemplary embodiment of an endless track of this invention which is driven by a drive system employing toothed sprocket wheels.

Reference is now made to FIG. 1 of the drawing which illustrates a lower rear portion of a typical vehicle in the form of a conventional snowmobile 20 which employs an endless traction belt or endless track 21 of this invention and the track 21 is supported for movement in an endless path by an associated slide rail suspension system which is designated generally by the reference numeral 22 and includes a pair of slide rails 23 arranged at opposite sides of the slide rail system 22. The snowmobile 20 includes a main body portion 24 which may be provided with a passenger carrying seat, (not shown) and the snowmobile 20 may also have a front portion (also not shown) which may be suitably mounted in any known manner such as on skies, for example, and provided with steering means such as a handlebar, or the like.

Figure 4:
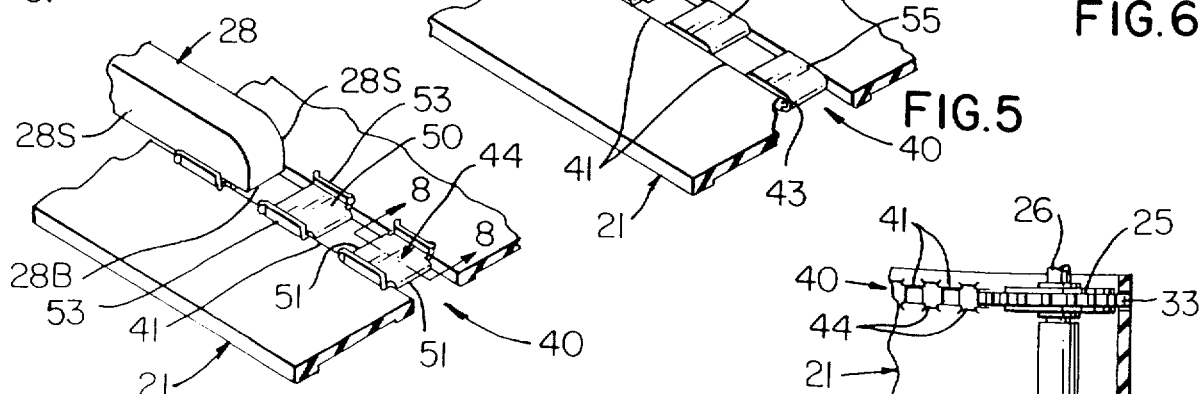
FIG. 4 is a fragmentary perspective view of the track main body particularly illustrating typical clips and associated cleats snap fitted in position therearound and with one of the cleats engaging a portion of an associated slide rail of the slide rail system.

The snowmobile 20 is driven by a sprocket drive system which in this example comprises a plurality of two toothed sprocket wheels 25 arranged in spaced relation and fixed to a common drive shaft 26 which is suitably operatively connected to and driven by a conventional drive motor or engine (not shown) which comprises the snowmobile 20. The snowmobile 20 is provided with a plurality of toothed sprocket wheels at the opposite end of the slide rail system 22 and as illustrated at 27 in FIG. 1 and the toothed sprocket wheels at 27 are also designated by the reference numeral 25 and serve, in essence, as idler sprocket wheels. The suspension system 22 has its oppositely arranged slide rails 23 arranged in spaced parallel relation and the slide rail 23 at each side is made of two parts each designated by the reference numeral 28 which are pinned together by a pin 29. Each slide rail part 28 is yieldingly supported by an associated pair of supporting rods 30 which are suitably attached to the frame portion 31 of the snowmobile and the rods 30 have suitable spring devices (not shown) operatively connected thereto and to the frame portion 31 which serve to cushion the slide rails 23 and hence the entire snowmobile 20. As seen in FIG. 4, each slide rail 23 and in particular each part 28 thereof has a flat bottom surface 28B and a pair of vertically arranged planar side portions 28S adjoining opposite edges of the bottom surface 28B.

Each sprocket wheel 25 has a plurality of sprocket teeth 23 extending therefrom in equal angularly spaced relation and the sprocket teeth 33 are particularly adapted to engage the endless track 21 and move such track in its endless path about the slide rail system 22 and in a manner to be described in detail subsequently.

Figure 2:
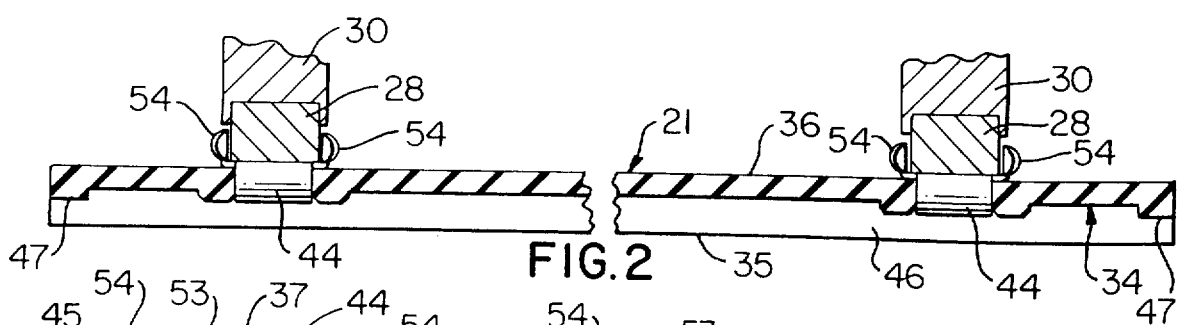
FIG. 2 is an enlarged cross-sectional view with the central portion broken away taken essentially on the lines 2—2 of FIG. 1 particularly, illustrating the elastomeric main body of the endless track and the manner in which the track engages spaced parallel rails of the slide rail system.

As seen particularly in FIG. 2, the endless track 21 comprises a main body 34 made primarily of an elastomeric material and having a ground-engaging surface 35 and an inside surface 36. The main body is illustrated in the drawing as being made of rubber, which may be either a natural rubber compound or a synthetic rubber compound; however, it will be appreciated that the main body 34 may be made of any suitable synthetic plastic material such as any suitable polymer.

The track 21 has a plurality of reinforcing members each designated by the same reference numeral 37 (also see FIG. 3) extending substantially across the full width of such track perpendicular to its endless path and the members 37 are arranged along the track in equally spaced parallel relation. The members 37 may be made of any suitable high-strength material and preferably such members are made of a suitable metallic material such as steel, or the like.

Figure 7:
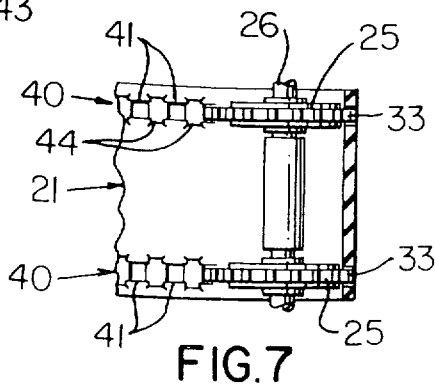
FIG. 7 is a fragmentary cross-sectional view drawn to a reduced scale and taken essentially on the line 7—7 of FIG. 1.

As seen in FIG. 7, the endless track 21 of this example has a plurality of two sets of openings therein with each set being designated generally by the reference numeral 40 and each opening in each set is designated by the reference numeral 41. The openings 41 in each set 40 are arranged in spaced aligned relation along the endless path of the track 21 and the openings 41 in the adjacent pair of sets 40 are arranged so that a pair of openings, one from each set 40, are aligned along an associated reinforcing member 37. Thus, each opening 41 is aligned in two directions, i.e., in its set of openings 40 as well as with an associated opening 41 in the other set.

The endless track 21 also has a plurality of metal clips 43 each lamped n telescoped relation around an associated reinforcing member 37 adjacent an associated opening 41. Each clip 43 is particularly adapted to be engaged by a toothed sprocket wheel 5 preferably through an associated cleat 44 which shields or protects the clip 43 and as will be described in detail later, and in particular each clip 43 is adapted to be engaged by a tooth 33 of an associated sprocket wheel 25 whereby a driving force is transmitted to the clip which transmits such force to its associated reinforcing member 37 which in turn transmits the force to the main body 34 of the endless track 21 so that the track may be driven in its endless path.

Each clip 43 is preferably in the form of an extruded metal member made of any suitable metallic material; however, each clip is preferably made of a metallic material containing alumuinum. Each clip 43 has a groove 45, see FIG. 3, extending axially therealong and the groove 45 is dimensioned so that it slidably receives an associated reinforcing member 37 therethrough in a comparatively snug-fitting relation. The groove 45 in this example is shown as having a roughly C-shaped configuration and such groove is particulary adapted to receive an associated reinforcing member 37 therethrough which has a rectangular cross-sectional configuration; however, it will be appreciated that a modified clip may be provided with a groove similar to the groove 45 yet of any suitable non-circular configuration so that it may slidably and telescopically receive a reinforcing member similar to the reinforcing member 37 and which has a corresponding non-circular cross-sectional configuration so that once the modified clip is engaged by an associated tooth 33 of a sprocket wheel 25 a driving force may be transmitted thereto without rotation of the modified clip about its reinforcing member.

Figures 3, 8:
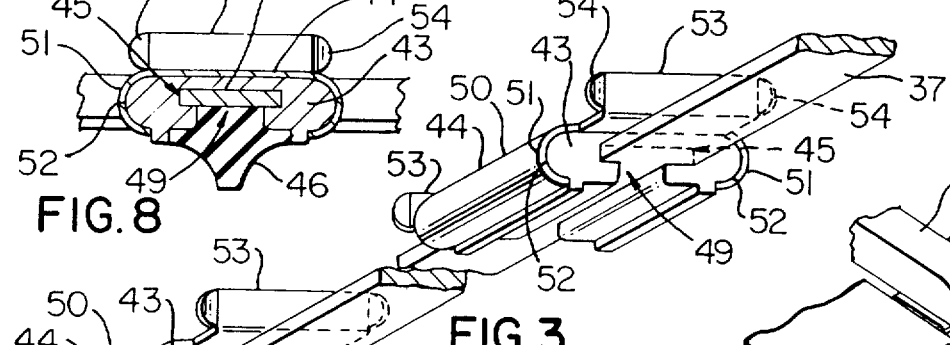
FIG. 3 is a fragmentary perspective view of a typical reinforcing member and its associated pair of extruded clips slidably received in telescoped relation therearound prior to embedment of the member and clips in the elastomeric main body of the track and also showing a pair of cleats snap fitted around the clips.
FIG. 8 is a cross-sectional view taken essentially on the line 8—8 of FIG. 4.

As will be apparent from FIG. 8 the endless track 21 has a plurality of integral traction portions or ribs 46 preferably made of the same elastomeric material used to make the main body 34; and, the ribs 46 of this example extend substantially completely across the full width of the track 21 between the side ribs 47 which define opposite side edges of the track. The ribs 46 are made, in a known manner, during the process of making the elastomeric main body 34 and embedding the reinforcing members 37 and clips 43 in the main body. The ribs 46 are defined and tenaciously bonded to both the clips 43 and members 37 at 49 in a simultaneous manner.

The endless track 21 preferably employs a plurality of the previously mentioned cleats 44. Each cleat 44 is made of a wear resistant metallic material such as spring steel and as seen in FIGS. 3–4, each cleat 44 has a main body 50 adjoined at its opposite ends by a pair of arcuate spring-like portions 51 which adjoin opposite ends of the main body 50 and are provided as an integral part thereof. The arcuate portions 51 enable the cleat 44 to be snap-fitted around corresponding arcuate portions 52 of an associated extruded clip 43.

Each cleat 44 also has a pair of oppositely arranged lateral wings 53 extending from opposite side edges thereof and each of the lateral wings 53 has beveled or outwardly diverging edges 54 extending from its opposite ends which enable unobstructed sliding movement of the cleat 44 and hence its associated clip 43 along the rails 23 of the slide rail system 22. The wings 53 serve the dual purpose of being guide means for the endless track 21 as well as serving as heat dissipators or heat dissipation pins for the cleat 44 and its clip 43. It will also be appreciated that the snap-fitted cleats 44 create a discontinuity and poor heat conductivity between such cleats and their clips 43 which tends to minimize heat build-up of the clips 43 and hence minimizes any tendency for excessive heating of the adjoining portions of the elastomeric main body 34 of the endless track 21. The cleats 44 also prevent wear of the clips 43 due to the driving action of the sprocket teeth 33.

The cleats 44 may also have the outside surfaces of their main bodies 50 suitably treated with or made of a compatatively anti-frictional material to thereby assure operation of the track 21 about the slide rail system with a minimum friction.

Figure 5:
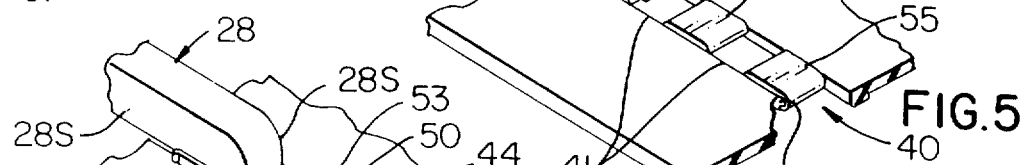
FIG. 5 is a view similar to FIG. 4 and particularly illustrating another embodiment of a snap-fitted cleat which is provided without guide wings.

It will be appreciated that the endless track of this invention may be provided with cleats similar to the cleat 44 yet which do not have lateral wings and such a track is illustrated in FIG. 5 and also designated by the reference numeral 21 and the cleats thereof each designated by the reference numeral 55. The cleats 55 prevent frictional wear of associated clips 43 which would otherwise be caused by the slide rails 23 and also provide wear surfaces which prevent wear of the clips 43 which might be caused by the sprocket teeth 33.

Figure 6:
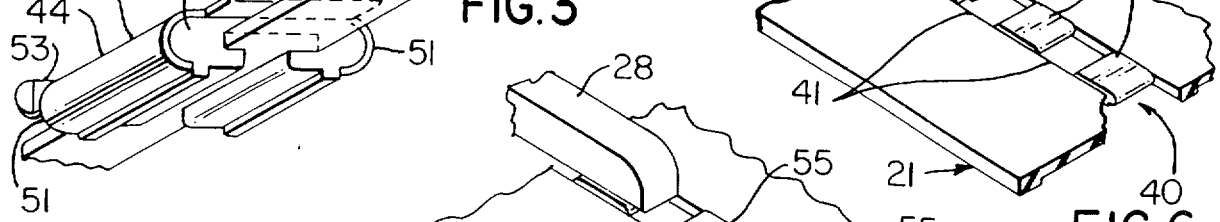
FIG. 6 is a view similar to FIG. 4 wherein the track does not employ cleats around its clips.

The endless track of this invention need not necessarily have protective cleats around its associated clips 43 and such a modified version of an endless track is illustrated in FIG. 6 and also designated by the reference numeral 21. The track 21 of FIG. 6 has its clips 43 exposed; however, it will be appreciated that such clips 43 provide an optimum structure in the form of an extruded metal member each carried directly by an associated reinforcing member 37 and thereby enable efficient transmittal of driving forces to the endless track. Further, the utilization of extruded members to define the clips 43 enables the precise forming of surfaces defining openings 41 not only in the track of FIG. 6 but also in the other embodiments of endless tracks disclosed herein which have protective cleats snap-fitted therearound.

In this disclosure of the invention, reference has been made to the formation of ribs 46 which are provided as an integral part of each endless track 21 with such ribs 46 being made of the same elastomeric material as the main body. As previously suggested the ribs 46 serve as traction portions for its associated endless track 21 and while shown and described herein as being of elastomeric material such traction components may be made of any suitable material and fixed to the endless track using any technique known in the art.

The endless track of this invention has been illustrated and described as being of the type which is driven by a drive system which employs toothed sprocket wheels; however, it is to be understood that an endless track similar to the track 21 may be provided with extruded clips in telescoped relation around the associated reinforcing members and provided with projections extending from the inside surface thereof while being free of openings so that such a track would be of the so-called "inside-drive" type rather than being driven by toothed sprocket wheels. In the case of such an inside-drive type of track, the clips with or without cleats would serve as bearing members facilitating efficient movement of the track around its associated slide rail system and where winged cleats of the type illustrated in FIG. 3 are provided such winged cleats would also serve to guide the track during movement thereof in its endless path.

While present exemplary embodiments of this invention, and methods of practicing the same, have been illustrated and described, it will be recognized that this invention may be otherwise variously embodied and practiced within the scope of the following claims.

What is claimed is:

1. An endless track adapted to be moved in an endless path and comprising, a main body made primarily of an elastomeric material and having a ground engaging surface an inside surface, a plurality of reinforcing members extending substantially perpendicular to said endless path, a plurality of openings in said main body arranged in at least one rectilinear row with each opening being closely adjacent an associated reinforcing member, and a plurality of metal clips each supported in clamped relation around an associated reinforcing member and each clip being adapted to be engaged by a toothed sprocket wheel which is adapted to drive said track in its endless path.

2. A track as set forth in claim 1 in which each of said reinforcing members has a non-circular cross-sectional configuration.

3. A track as set forth in claim 1 in which each of said reinforcing members has a substantially rectangular cross-sectional configuration and each of said clips has a longitudinal groove therein which is adapted to slidably receive an associated reinforcing member therethrough.

4. A track as set forth in claim 1 and further comprising a plurality of cleats each supported in snap-fitted relation around an associated clip and each being made of a wear-resistant material.

5. A track as set forth in claim 4 in which each of said cleats is made of a spring steel.

6. A track as set forth in claim 1 in which each of said reinforcing members has a substantially rectangular cross-sectional configuration, each of said clips is made of an extruded metallic material and has a longitudinal groove therein which is adapted to slidably receive an associated reinforcing member therethrough, and further comprising a plurality of cleats made of a wear-resistant metallic material with each cleat being supported in snap-fitted relation around an associated clip, each of said cleats having a substantially planar outside surface which is particularly adapted to engage an associated rail of a slide rail system for said track to allow movement of said track along the rail with minimum wear.

7. A track as set forth in claim 6 and further comprising a plurality of traction portions for said track made of an elastomeric material and being bonded to each of said clips, said traction portions being provided as an integral part of said main body.

8. A track as set forth in claim 6 in which each of said cleats has lateral wings extending from opposed side edges thereof, said wings serving the dual purpose of guiding the track along the slide rail system and dissipating heat generated during sliding movement of the cleats along the slide rail system.

9. A track as set forth in claim 8 in which each of said wings has outwardly diverging ends which enable unobstructed sliding movement thereof along an associated slide rail.

10. A track as set forth in claim 1 in which said plurality of openings are arranged in a spaced pair of parallel rows which extend along said endless path and each opening in one row is arranged closely ajacent an associated reinforcing member and in aligned relation with an associated opening also arranged closely adjacent said associated reinforcing member whereby an imaginary line between the openings closely adjacent an associated reinforcing member extends perpendicular the endless path.

11. An endless track adapted to be moved in an endless path and comprising, a main body made primarily of an elastomeric material and having a ground engaging surface and an inside surface, a plurality of reinforcing members extending substantially across the full width of said track substantially perpendicular to said endless path, a plurality of sets of openings in said main body, said openings in each set being arranged in aligned relation along said endless path and associated openings in adjacent sets being arranged in spaced relation along an associated reinforcing member and closely adjacent thereto, and a plurality of metal clips each supported in clamped relation around an associated member adjacent an associated opening and each clilp being adapted to be engaged by an associated toothed sprocket wheel which is adapted to drive said track in its endless path.

12. A track as set forth in claim 11 in which each of said reinforcing members has a non-circular cross-sectional configuration and each of said clips has a longitudinal groove therein corresponding to said non-circular cross-sectional configuration and is adapted to slidably receive an associated reinforcing member therethrough.

13. A track as set forth in claim 12 and further comprising a plurality of cleats each supported in snap-fitted relation around an associated clip and each being made of wear-resistant material, said cleats having substantially planar outside surfaces which are particularly adapted to engage associated rails of a slide rail system for said track to allow movement of said track along the rails with minimum wear.

14. A track as set forth in claim 13 and further comprising a plurality of traction portions for said track made of an elastomeric material and being bonded to each of said clips and said reinforcing members, said traction portions being provided as an integral part of said main body.

15. A track as set forth in claim 13 in which each of said cleats has lateral wings extending from opposite side edges thereof, said wings serving the dual purpose of guiding said track along said associated slide rails of said slide rail system and dissipating heat generated during sliding movement of the cleats along the associated slide rails.

16. A track as set forth in claim 15 in which each of said wings has outwardly diverging ends which enable unobstructed sliding movement thereof along an associated slide rail.

17. In combination: a slide rail system for a snowmobile or the like and an endless track supported around said slide rail system and being adapted to be moved in an endless path around said slide rail system, said slide rail system comprising a pair of spaced parallel rails and said endless track comprising, a main body made primarily of an elastomeric material and having a ground engaging surface and an inside surface, a plurality of reinforcing members embedded in an extending across said track substantially perpendicular to said endless path in spaced relation along said path, a plurality of metal clips supported in clamped relation around said reinforcing members, said clips being arranged in a pair of sets with each set extending along said endless path, each of said clips of each set being positioned in said endless track so that with said endless track supported around said slide rail system each clip is arranged in vertically aligned relation with an associated one of said pair of rails, and a plurality of wear-resistant cleats each supported in snap-fitted relation around an associated clip, said cleats serving as a bearing member allowing movement of said track around said slide rail system in an anti-friction manner.

18. A combination as set forth in claim 17 in which each of said clips is made of an extruded metallic material and each of said cleats has lateral wings extending from opposite side edges thereof, said wings serving the dual purpose of guiding the track along the slide rail system and dissipating heat generated during movement of the cleats along the slide rail system.

19. A combination as set forth in claim 18 in which each of said wings has outwardly diverging ends which enable unobstructed sliding movement thereof along an associated slide rail.

20. A combination as set forth in claim 19 in which each of said slide rails has a substantially flat bottom surface which is particularly adapted to be engaged by a main body portion of each of its associated cleats, and each slide rail has a pair of vertically arranged planar portions adjoining opposite edges of its flat bottom surface, said planar portions being particularly adapted to be engaged by said lateral wings to guide the cleats and hence the track along the slide rail system.

* * * * *